(12) United States Patent
Davidson

(10) Patent No.: US 7,925,593 B2
(45) Date of Patent: Apr. 12, 2011

(54) SERVICE AND METHOD FOR PROVIDING A SINGLE POINT OF ACCESS FOR MULTIPLE PROVIDERS' VIDEO AND AUDIO CONTENT

(76) Inventor: Robert Steven Davidson, Collegeville, PA (US)

( * ) Notice: Subject to any disclaimer, the term of this patent is extended or adjusted under 35 U.S.C. 154(b) by 0 days.

(21) Appl. No.: 12/473,465

(22) Filed: May 28, 2009

(65) Prior Publication Data

US 2009/0240693 A1  Sep. 24, 2009

Related U.S. Application Data

(63) Continuation of application No. 10/831,836, filed on Apr. 26, 2004, now Pat. No. 7,555,465.

(51) Int. Cl.
*G06Q 20/00* (2006.01)
(52) U.S. Cl. ............... 705/76; 705/64; 705/67; 705/72; 705/75
(58) Field of Classification Search ............... 705/64, 705/67, 72, 75, 76
See application file for complete search history.

(56) References Cited

U.S. PATENT DOCUMENTS

| 6,611,812 | B2 * | 8/2003 | Hurtado et al. ............... 705/26 |
| 7,039,635 | B1 * | 5/2006 | Morgan et al. ............... 1/1 |
| 7,213,005 | B2 * | 5/2007 | Mourad et ............... 705/64 |
| 2003/0229900 | A1 * | 12/2003 | Reisman ............... 725/87 |
| 2004/0019658 | A1 * | 1/2004 | Plastina et al. ............... 709/217 |
| 2006/0184617 | A1 * | 8/2006 | Nicholas et al. ............... 709/203 |
| 2007/0192253 | A1 * | 8/2007 | Gill et al. ............... 705/51 |
| 2008/0208692 | A1 * | 8/2008 | Garaventi et al. ............... 705/14 |
| 2009/0012992 | A1 * | 1/2009 | Gill et al. ............... 707/103 R |
| 2010/0042688 | A1 * | 2/2010 | Maghraby ............... 709/206 |
| 2010/0279665 | A1 * | 11/2010 | Hardin et al. ............... 455/414.1 |

* cited by examiner

*Primary Examiner* — Pierre E Elisca

(57) ABSTRACT

A method that uses a computer network to provide a single point of access between a plurality of video & audio devices and a plurality of video & audio content provider systems. The present invention is a method for providing a searchable, aggregated directory view of available video & audio content from multiple content providers as well as additional services such as content renting. The present invention includes a method for identifying users as subscribers of content providers' memberships.

8 Claims, 18 Drawing Sheets

202

Search

| Show | Date | Provider | Price |
|---|---|---|---|
| The Matrix | 1999 | (multiple) | |
| The Matrix Reloaded | 2003 | (multiple) | |
| Maximum Security | 1989 | CinemaNow | $2.99 |
| The Medallion | 2003 | Movielink | $4.99 |
| Medic<br>Break through the bars | 1956 | Movieflix | (member) |
| Medic<br>Flash of Darkness | 1955 | Movieflix | (member) |
| Money Train | 1995 | Movielink | $2.99 |

Select Provider

| Provider | Price |
|---|---|
| CimemaNow | $2.99 |
| Movielink | $2.95 |

FIG. 6

Player Search Content Request — 210

```
<SearchContentRequest>
    <SearchCriteria>
        <ProviderID>cinemanow</ProviderID>
        <ProviderID>movielink</ProviderID>
        <CategoryID>scifi</CategoryID>
        <CategoryID>drama</CategoryID>
        <RatingID>PG13</RatingID>
        <ContentFormat>MPEG4</ContentFormat>
    </SearchCriteria>
</SearchContentRequest>
```

Player Search Content Response (Alt) — 232

```
<SearchContentResponse>
    <ContentSummary>                    233
        <Name>The Matrix</Name>
        <ReleasedYear>1999</ReleasedYear>        215
234——— <ContentProvider>
            <ProviderID>movielink</ProviderID>
            <ContentID>matrix1999</ContentID>   224
            <Cost>2.99</Cost>
        </ContentProvider>
        <ContentProvider>
            <ProviderID>cinemanow</ProviderID>
            <ContentID>SF19</ContentID>
            <Cost>2.95</Cost>
        </ContentProvider>
    </ContentSummary>
    <ContentSummary>
        <ContentID>1235</ContentID>
        <Name>The Matrix Reloaded</Name>
        <ReleasedYear>2003</ReleasedYear>
        <ContentProvider>
            <ProviderID>cinemanow</ProviderID>
            <ContentID>SF20</ContentID>
            <Cost>2.99</Cost>
        </ContentProvider>
    </ContentSummary>
</SearchContentResponse>
```

FIG. 17

SERVICE AND METHOD FOR PROVIDING A SINGLE POINT OF ACCESS FOR MULTIPLE PROVIDERS' VIDEO AND AUDIO CONTENT

CROSS-REFERENCE TO RELATED APPLICATIONS

This is a continuation application and claims priority to U.S. patent application Ser. No. 10/831,836, filed Apr. 26, 2004 now U.S. Pat. No. 7,555,465, and entitled "Service and Method for Providing a Single Point of Access for Multiple Providers' Video and Audio Content," the contents of which are hereby incorporated by reference in its entirety.

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright 2004, Robert Steven Davidson, All Rights Reserved.

BACKGROUND OF THE INVENTION

Video-On-Demand (VOD) movies and programs, as well as Internet Radio and audio programs have become widely available on today's Internet. Dozens, if not hundreds, of web sites offer streaming/downloadable movies and television programs, radio programs, etc. (collectively referred to as content). These web sites allow people to access this content from their computers and download or stream the content, such that it can be viewed or listen to. The popularity of these sites will continue to grow as home broadband Internet access increases and as this content can be viewed or listened to from people's home entertainment systems.

One of the drawbacks of these sites is that people must go to each web site and search the site to determine if the particular content is available. This can be time consuming and frustrating. Another drawback is that each these sites requires a computer to access the programs and shows. These sites only provide access to devices that support the web site (or HTML) interface. The invention will allow people to find content from many different web sites as well as be able to access this content from devices attached to their home entertainment systems as well as from their computers.

Some devices have been created to access video-on-demand content that has been downloaded to their personal computer. Unfortunately, due to lack of standards in video & audio file formats, delivery mechanisms, and content security, many of these devices cannot access the content from the current video-on-demand web sites. This invention will help the devices locate content which they can support.

In addition to web sites, cable companies also offer video-on-demand. Unfortunately, this version of video-on-demand has several drawbacks. For one, only the content provided by the cable company is available. Secondly, at present time, this content is very limited, totally only 500 to 600 hours. This invention will greatly expand the content available to an individual as well as release the individual from the constraint of only accessing content from a single provider.

Some video/audio device companies will naturally desire to connect with some of the content providers. This invention will provide a single communications protocol for joining many devices to many content providers.

BRIEF SUMMARY OF THE INVENTION

The present invention is a method for providing a searchable, aggregated directory view of available video & audio content from multiple content providers as well as additional services such as content access and renting. Audio and video player devices connect via a network using a specific application programming interface (API) to a Service that provides the content directory view, the content access and renting service, as well as other services. Multiple content providers connect to the same Service via a network using a specific API to expose their available content and to provide their content access and renting service, as well as other services. People use the user interface (UI) on audio and video player devices to search for content and to access and play the content. People use their provider-specific membership credentials to access the content from the specific provider.

BRIEF DESCRIPTION OF THE SEVERAL VIEWS OF THE DRAWING

FIG. 5: Example player device UI for results of searching for content.

FIG. 6: Example player device UI for selecting a single content provider when multiple content providers exist for a particular content.

FIG. 17: Details possible data contained in alternate Player Search Content Request and Player Search Content Response.

DETAILED DESCRIPTION OF THE INVENTION

The present invention is primarily a method that defines a mechanism for exposing a single directory of available shows and programs (collectively referred to as content), including additional services, available from a plurality of content providers, to a plurality of video & audio (player) devices. The present invention's service sits in the middle of these devices and content providers' systems.

Figure 1:
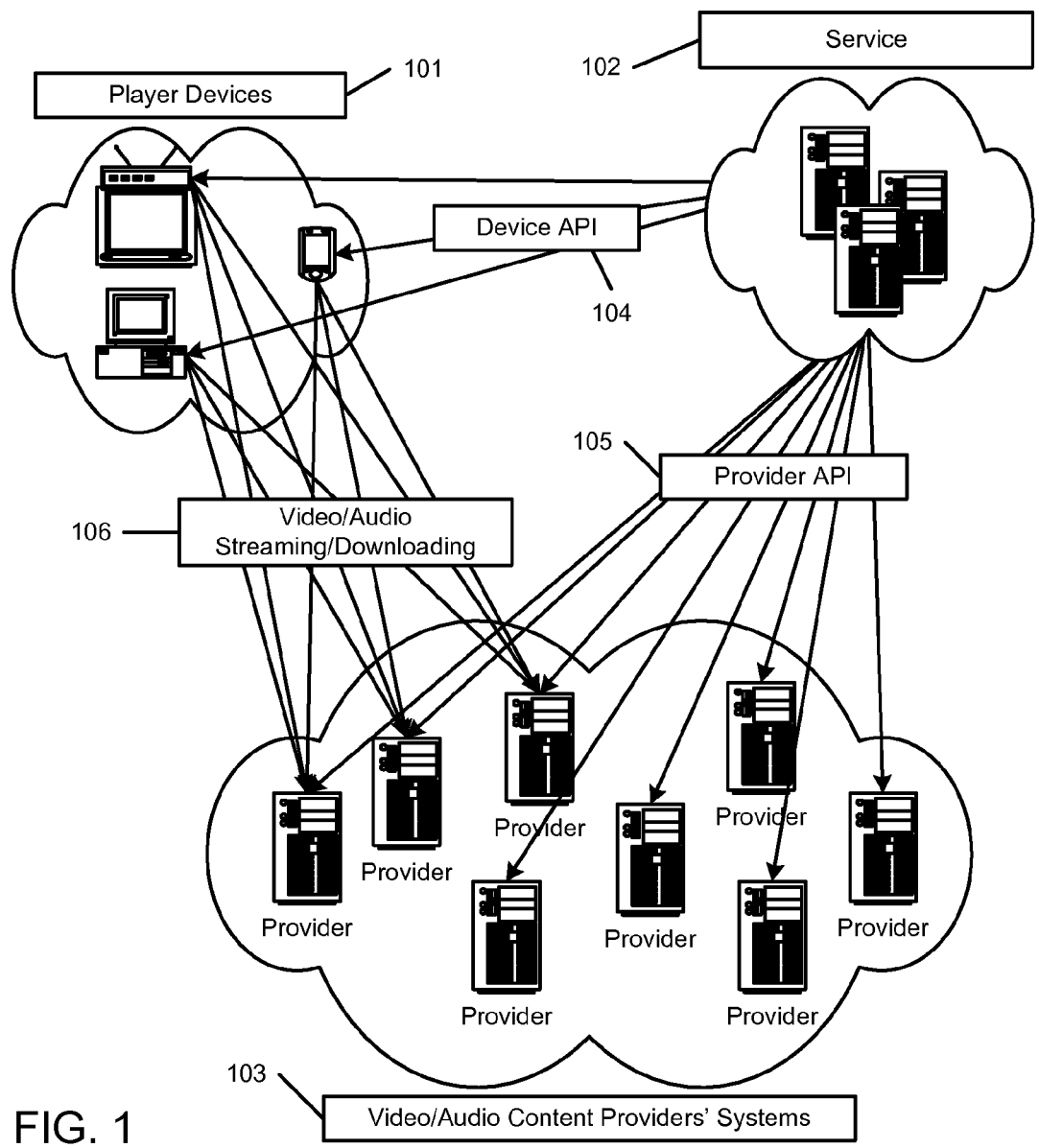
FIG. 1: A high level view of communications between player devices, the service, and content providers' systems.

As shown in FIG. 1, player devices 101 communicate with the present invention's service 102 via an application programming interface (device API) 104. The service 102 communicates with content providers' systems 103 via an API (provider API) 105. Once a player device 101 has permission to access a piece of content from a specific content provider, the player device 101 communicates directly with the content provider's system 103 using a protocol for video or audio streaming or downloading 106.

For the purposes of the present invention, "content", "shows", and "programs" refer to any video or audio performance including, but not limited to, movies, television shows, music, radio programs, advertisements/commercials, movie trailers, live events, etc.

For the purposes of the present invention, "content format" is used as a generic term to refer to the specific data format used to encode content, and in some cases the delivery mechanism for the content. Content providers will offer a specific piece of content in one or more content formats. Player devices 101 will have the ability to play content in specific content formats. Content formats are used to match which player devices 101 can play which content. Examples of content format would be MPEG2, MPGE4, QuickTime, and Windows Media, or in cases of streaming media, possibly RTSP (real-time streaming protocol). Content format may also be used to define video resolution of the content, such as 480i, 720p, 1080i, etc.

"Player devices" 101 and "Video & audio devices" are any device capable of audio and/or video playback. For video playback, these player devices 101 would have a video screen (such as a television or a computer monitor or even a display as found on a personal digital assistant and a laptop computer). For audio playback, these player devices 101 would have sound speakers. Additionally, these player devices 101 would have the means to support a user-interface, such a shown in FIG. 5.

Examples of these player devices 101 include, but is not limited to, cable set-top boxes, computers, gaming consoles (PlayStation2, Xbox, etc.), DVD players, Digital Video Recorders (TiVo, etc.), and other specialize devices (PRIMISIQ, etc.).

Figure 2:
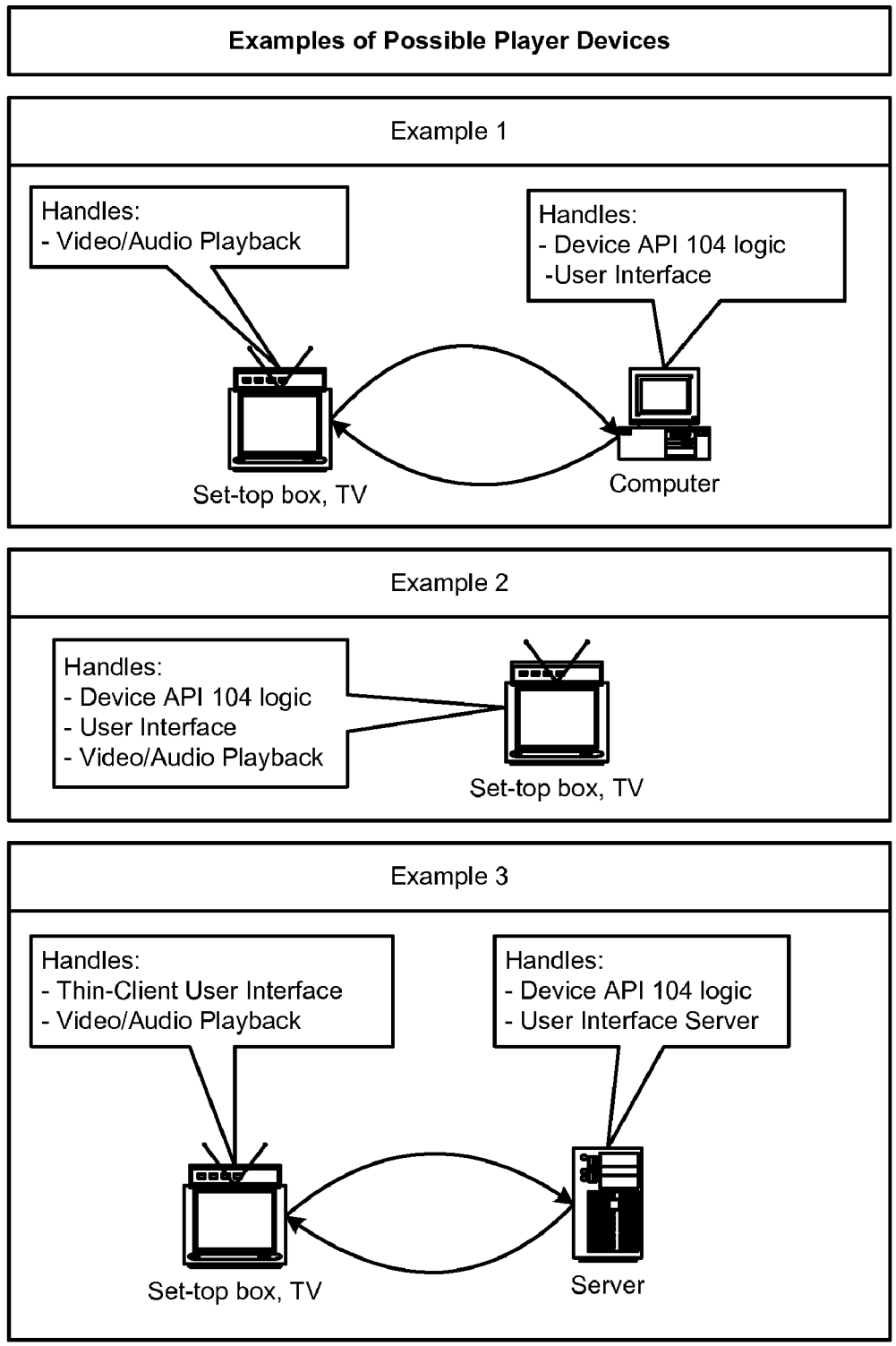
FIG. 2: Examples of different possible combinations of physical devices to make a single logical player device.

These player devices 101 may consist of more than one physical or logic device. FIG. 2 shows 3 possible examples, although many more exist. Example 1 is an example of how a computer, a set-top box, and a television work together to provide the single, logical player device 101. For example, the computer could provide the user interface and the device API 104 components for interacting with the service 102 while the set-top box and television perform the actual audio and/or video playback. Example 2 is an example of how a set-top box and television could provide all the necessary components of the player device 101 without the aide of a computer. Example 3 is an example of how a set-top box may incorporate thin-client functionality, such as supporting Internet web browser capabilities like HTML and JavaScript, while a computer server is providing the user interface logic and the device API 104 components. Together the set-top box, television and computer server create the logical player device 101. An individual trained in the art could create additional player devices 101 without departing from the spirit and scope of this invention.

The service 102 consists of one or more computers in a system that contains a computer software program that implements device API 104 for communicating with player devices 101 and that contains a computer software program that implements provider API 105 for communicating with content providers' systems 103. Both of these computer software programs may be implemented separately or may be implemented in a single computer software program that performs two tasks. This system would have the appropriate mechanisms for sending a receiving data over a network. While the present invention does not require use of a database for the service 102, someone trained in the art could incorporate a database for various reasons. Some reasons, but certainly not all reasons, might be for better performance and efficiency, to track various data about the service 102 and the use of the service 102, and possibly to provide additional services and functionality to the player device 101.

"Content providers", or simply "providers", are entities that offer content. They may offer the content anonymously or possibly via a membership. The content may be free of charge or provided for a cost. "Membership credentials" are the data used by content providers to identify users for non-anonymous access. Each user would have unique membership credentials at a content provider. Examples of membership credentials would be user names, passwords, email addresses, etc.

Content providers' systems 103 consists of one or more computer systems per content provider that contains a computer software program that implements provider API 105 for communicating with the service 102 and that contains a computer software program that implements video/audio streaming/downloading 106. These systems would have the appropriate mechanisms for sending a receiving data over a network. These systems would have access to a permanent storage mechanism for storing and retrieving content. In some cases, an intermediate service may be incorporated to provide translation to and from Provider API 105 to another service access point from the content provider. For example, an intermediate service may convert Provider API 105 into a series of HTTP/HTML requests for accessing content provider via their public Internet web site. This intermediate service may exist on another entity's system or may exist as part of content provider's system 103. These components together constitute the content provider's system 103.

An application programming interface (API) refers to a mechanism for communicating a specific set of actions and data between two entities. Data communicated in this API is in a format that both entities understand. Some examples of this data format include XML, comma-delimited, or binary format. In cases where the two entities exist on different systems, or possibly exist in different processes within the same system, a mechanism would be required to pass the data across a network. Some examples of this mechanism include TCP/IP, NetBOIS, Serial, etc. This mechanism can be enhanced by using additional services such as HTTP or SOAP. In cases where to the two entities exist in the same system, implementation of this API would not require a network mechanism, although it could be used. An individual trained in art could implement this API using a variety of different techniques. Some of these include inter-process communications, such as DCOM or RPC, or even intra-process communication, such as software function calls.

Device API 104 is an API where player devices 101 understand how to instruct the service 102 to perform specific tasks related to this invention.

Provider API 105 is an API where the service 102 understands how to instruct content providers' systems 103 to perform specific tasks related to this invention. Device API 104 is different that provider API 105.

Video/audio streaming/downloading 106 is a mechanism to download or stream content from one device to another device. Downloading refers to receiving and storing content on the receiving device such that it may be accessed at a later time. Streaming refers to receiving content that would not be stored for later access. Some examples of an exiting mechanism for downloading include HTTP and FTP. An example of an existing mechanism for streaming includes RTSP (real-time streaming protocol). Future mechanisms for content access may be devised but are independent of the present invention.

Figure 3:
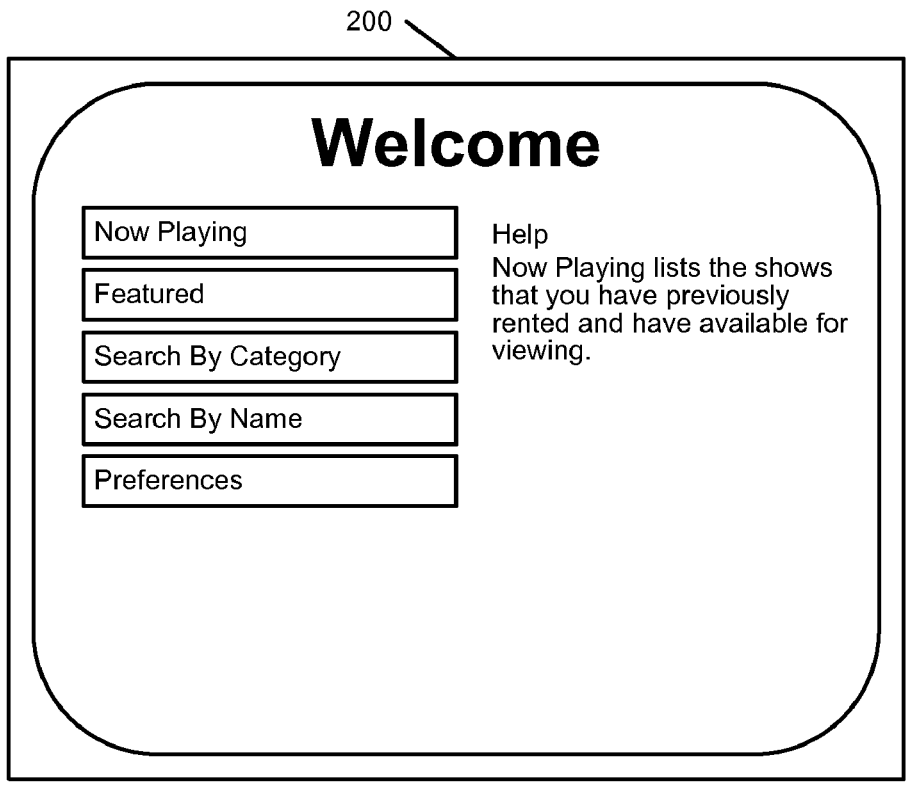
FIG. 3: Example player device user interface (UI) of available high-level options.
Figure 4:
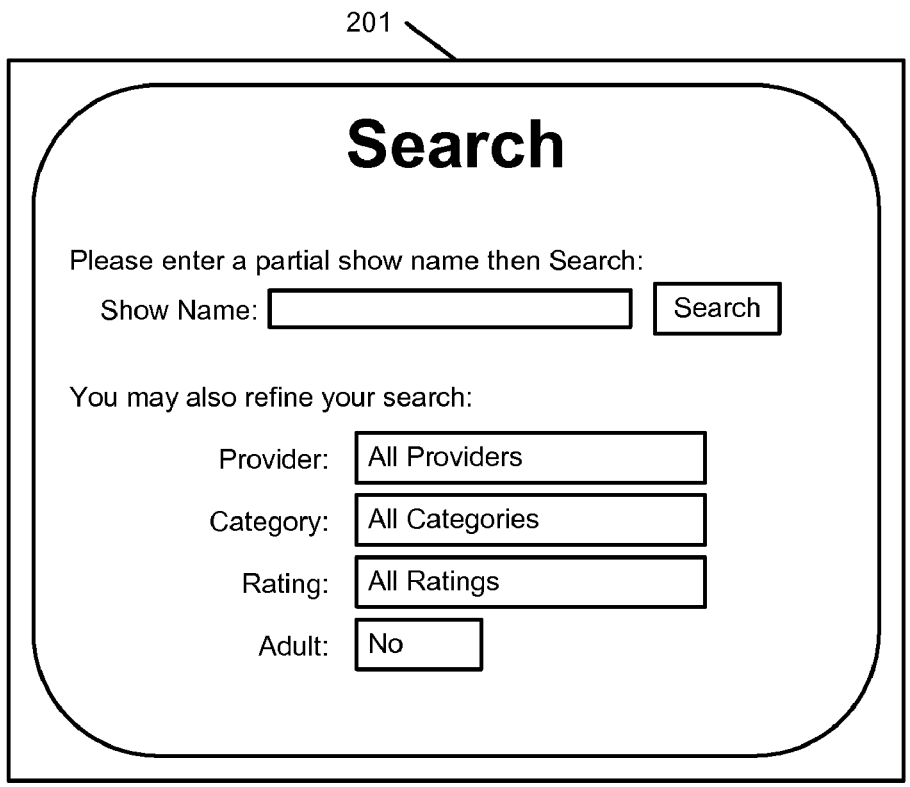
FIG. 4: Example player device UI for searching for content.
Figure 7:
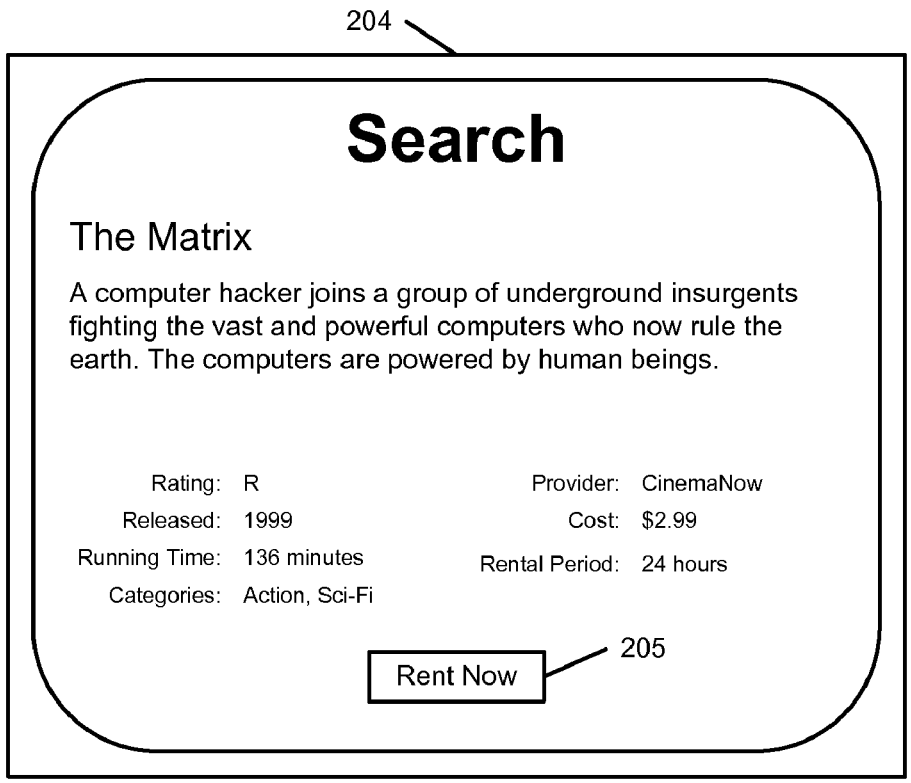
FIG. 7: Example player device UI for viewing details of a particular content.

As an example of the present invention, consider a set-top box connected to a television, as shown in Example 2 in FIG. 2, as a player device 101. On the player device 101, the user would be prompted with a list of options 200, as shown in FIG. 3. One of the options would be the ability to search for available content by specifying various search parameters and filter criteria 201, as shown in FIG. 4. The result of the search would display the matching content available 202 from a plurality of content providers, as shown in FIG. 5. The user could then select a particular content. If the content was available from multiple content providers, the user could select the desired provider 203, as shown in FIG. 6. Once a particular content is selected, the user could be shown the more details about the content 204, as shown in FIG. 7. There would be an option to rent the show 205, also shown in FIG. 7. Renting may involve a single, one time cost, or possibly renting could be available as part of a subscription plan from the content provider. For purposes of the present invention, the term "renting" includes any access to content, including free, anonymous access.

Figure 8:
FIG. 8: Example player device UI for displaying a particular content with VCR-like controls.

Once the content is rented, the player device 101 downloads or streams the content. As shown in FIG. 8, for video content, the player device 101 displays it 206 on its video display. For audio content, the player device 101 plays it though is sound speakers. The player device 101 could have VCR-like controls, such as fast-forward, rewind, pause, etc. 207.

Figure 9:
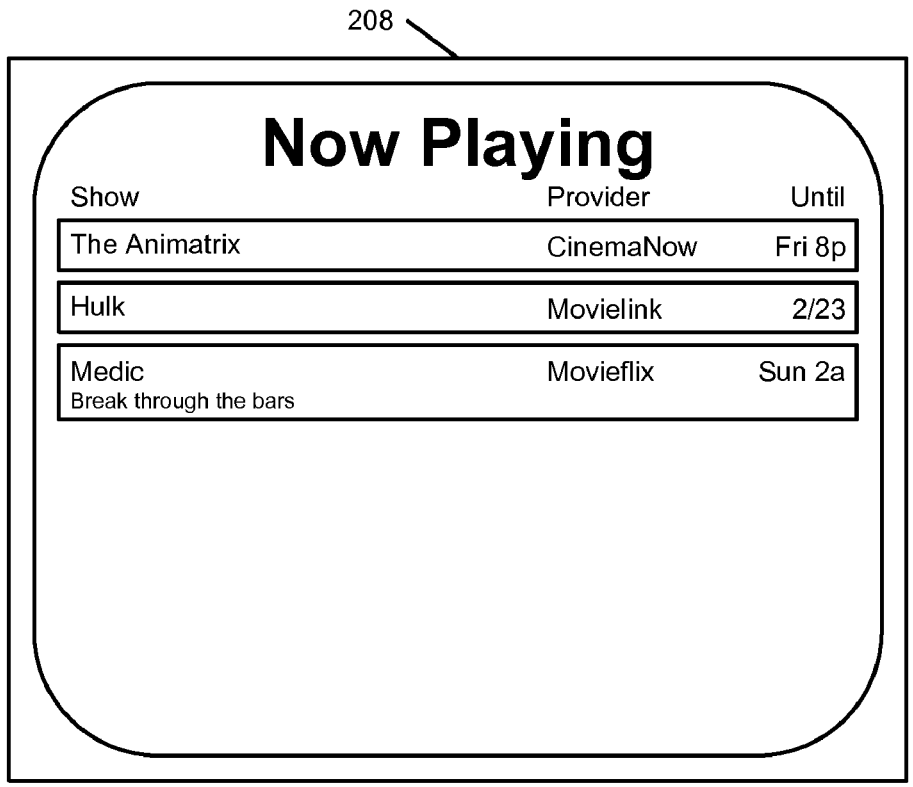
FIG. 9: Example player device UI for displaying a list of content that had been previously rented.

At a later point, as shown in FIG. 9, the user could return and see a list of content that had been rented 208. The user could select a particular content for watching or listening. Rented content may also have an activation or expiration period. An activation period defines when a rented content may first be viewed or listened to. It may be that a user can rent a show before its activation period. An expiration period defines when a rented contact can not longer be viewed or listened to.

Figure 10:
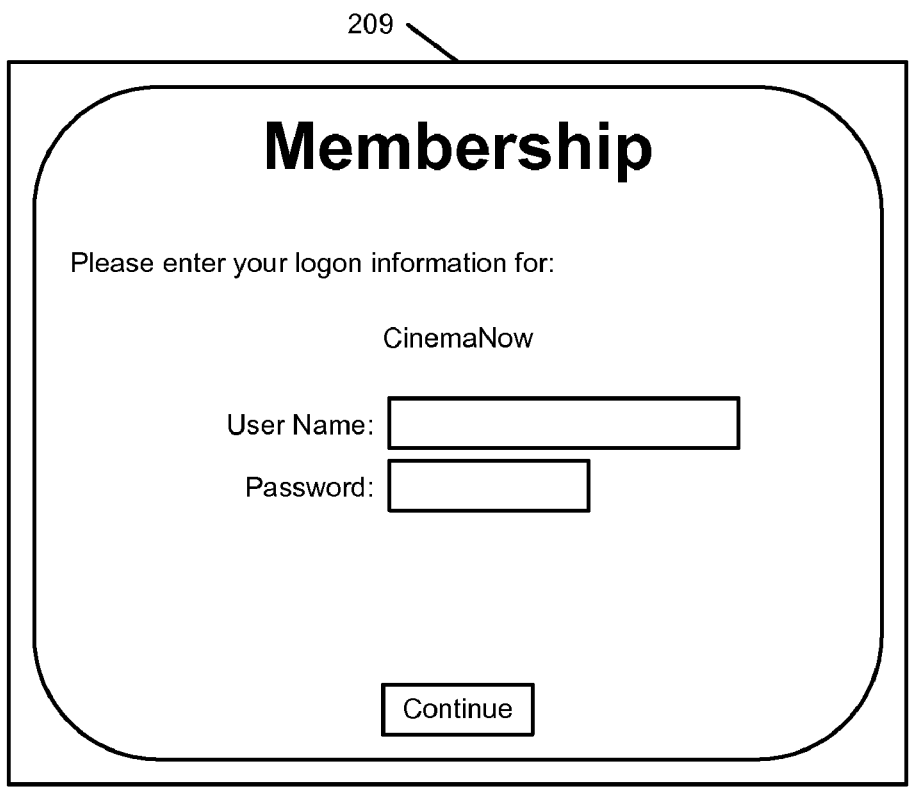
FIG. 10: Example player device UI for gathering a user's membership credentials for a single content provider.

Some content providers after free, anonymous access to their content. Other content providers require registration into their membership before their content can be accessed. The first time a user rents content from a content provider where membership access is required, the user would be prompted for their membership credentials 209, as shown in FIG. 10. If the user does not have a membership with the content provider, the user could be prompted to open a new membership.

Figure 11:
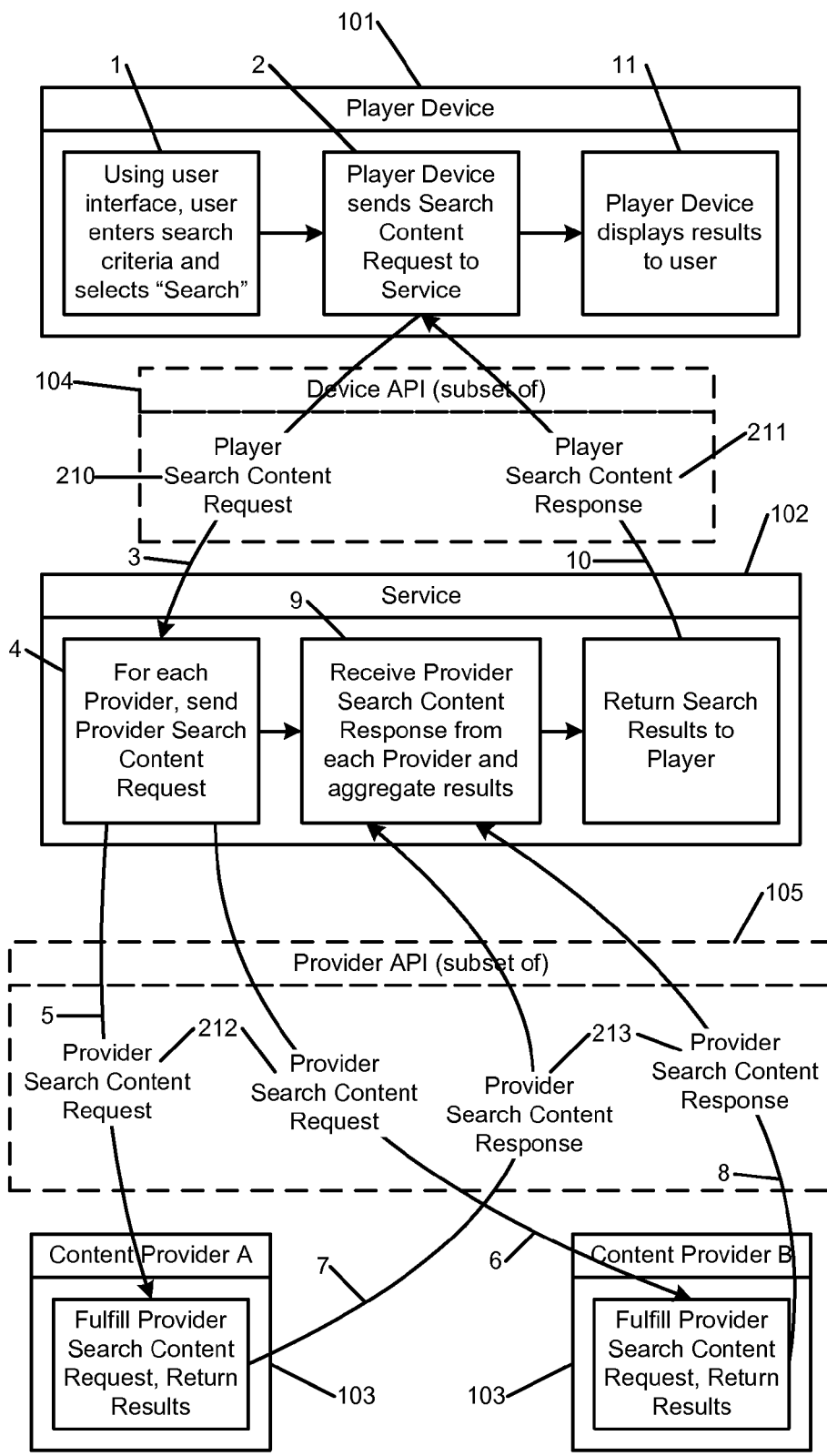
FIG. 11: Illustration of Search Content communications between player devices, the service, and content providers' systems.

Behind the scenes, communications between various computer systems and devices are happening. As shown in FIG. 11, when the player device 101 is instructed by the user to search for content (step 1), the player device 101 sends a Player Search Content Request 210 to the service 102 (steps 2 and 3). The service 102 in turn loops through each content provider in the search request and sends a Provider Search Content Request 212 to each content provider's system 103 (steps 4, 5, and 6). Each content provider's system 103 searches local storage based on the search criteria and responds with a Provider Search Content Response 213 (steps 7 and 8). As each Provider Search Content Response 213 is received from content providers' systems 103, the service 102 aggregates the results into a single list of content (step 9) and returns the content list in the Player Search Content Response 211 (step 10) to the player device 101. Finally, player device 101 displays the content list to the user (step 11). Player Search Content Request 210 and Player Search Content Response 211 are a subset of the Device API 104. Provider Search Content Request 212 and Provider Search Content Response 213 are a subset of the Provider API 105.

Figure 12:
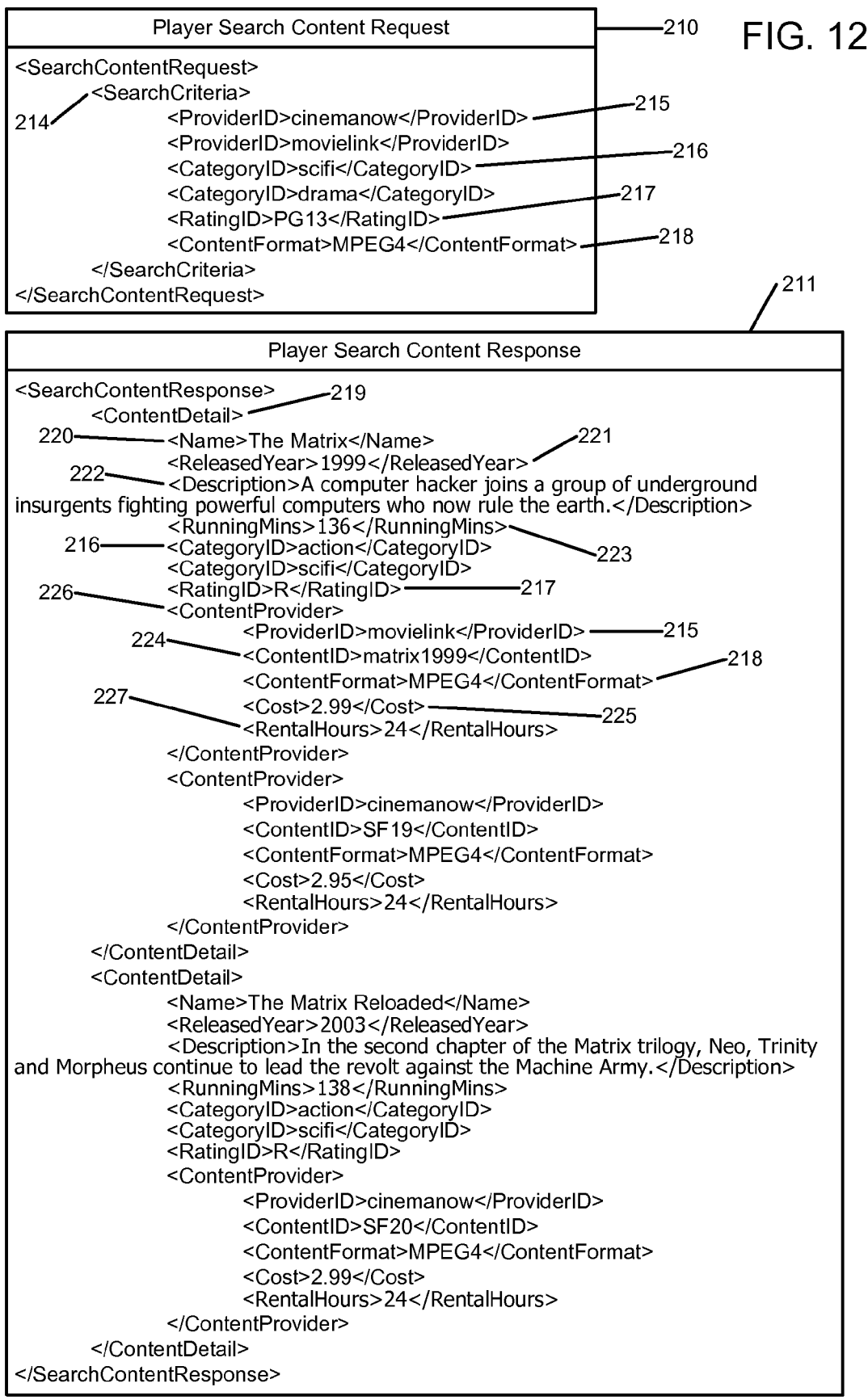
FIG. 12: Details possible data contained in Player Search Content Request and Player Search Content Response.

FIG. 12 illustrates in detail the Player Search Content Request 210 and the Player Search Content Response 211 data, from FIG. 11, as discussed in the example above. FIG. 12 shows the data in the XML format, but any format could be used. In the Player Search Content Request 210, there is a Search Criteria 214 data element. This data element contains the search and filter criteria to be used. Data element Provider ID 215 defines one or more content providers to be included in the search. If no Provider ID 215 data elements were included, it could be defined that all content providers' content would be returned. Data element Category ID 216 defines one or more content categories while data element Rating ID 217 defines one or more content ratings to be included in the search. Like Provider ID 215, if no Category ID 216 data elements were include, it could be defined that all content, regardless of category would be returned. Similar for Rating ID 217, if no data elements were included, all content regardless of rating would be returned. The Content Format 218 data element defines what particular content formats the player device 101 can support. At least one Content Format 218 data element would be required but many could be specified. Although only a few different types of data are illustrated in the Search Criteria 214 data element, it could easily be expanded to include many additional search and filter criteria. The Player Search Content Response 211 illustrates the data that could be returned as a result of the search. The Content Detail 219 data element is a container element, encapsulating the various data elements of a single piece of content. One Content Detail 219 data element would be returned for each piece of content that matched the search and filter criteria. The Name 220, Released Year 221, Description 222, Running Minutes 223, Category ID 216, Rating ID 217 data elements are various attributes of the specific content as supplied by the content provider's system 103. The Content Provider 226 data element defines one or more content providers where the specific content is available. The Provider ID 215 data element is a unique identifier for a specific content provider that is assigned by the service 102. The Content ID 224 data element is the content provider-assigned unique identifier for the specified content. The Content Format 218 data element is the format the content is available in. There may be multiple Content Format 218 data elements. The Cost 225 data element is the cost to rent the content from the content provider. The Cost 225 data element may also contain such values as "free" or "subscription" to define content that has no cost, or content that is available as part of subscription plan, respectively. This could be easily expanded to include additional cost structures. The Rental Hours 227 data element is the number of hours for the rental period of the content as defined by the content provider. Again, although only a few different content attributes are illustrated in the Content Detail 219 and Content Provider 226 data elements, they could easily be expanded to include many additional content attributes.

Figure 13:
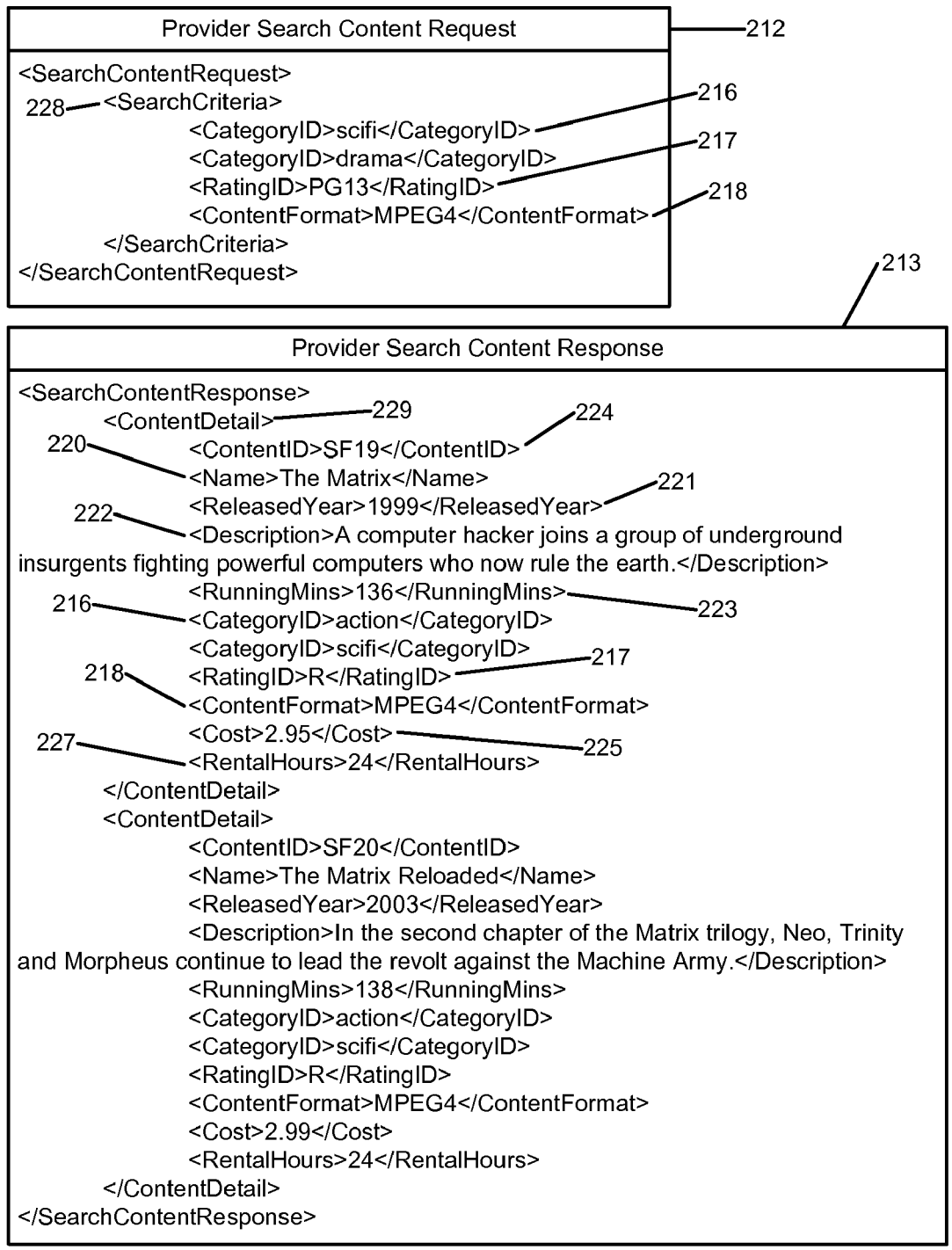
FIG. 13: Details possible data contained in Provider Search Content Request and Provider Search Content Response.

FIG. 13 illustrates in detail the Provider Search Content Request 212 and the Provider Search Content Response 213 data, from FIG. 11, as also discussed in the example above. Again, FIG. 13 shows the data in the XML format, but any format could be used. In the Provider Search Content Request 212, there is a Search Criteria 228 data element. This data element contains the search and filter criteria to be used. The Category ID 216 data element defines one or more content categories to be include in the search while the Rating ID 217 data element defines one or more content ratings to be included in the search. Like the Player Search Content Request 210 above, if no data elements are included for either Category ID 216 or Rating ID 217, the search could return content regardless of its categories or rating, respectively. The Content Format 218 data element defines at least one, but possibly more, content formats to be included in the search. Please note that since this request and response is for a single content provider, no Provider ID 215 is necessary. The Provider Search Content Response 213 illustrates the data that could be returned as a result of the search. The Content Detail 229 data element is a container element, encapsulating the various data elements of a single piece of content. One Content Detail 229 data element would be returned for each piece of content that matched the search and filter criteria. Each data element contain within the Content Detail 229 data element are the various attributes of the specific content as supplied by the content provider's system 103. These are the same data elements as discussed above in the Content Detail 219 or Content Provider 226 data elements. Again, although only a few different content attributes are illustrated in the Content Detail 229 data element, it could easily be expanded to include many additional content attributes.

Figure 14:
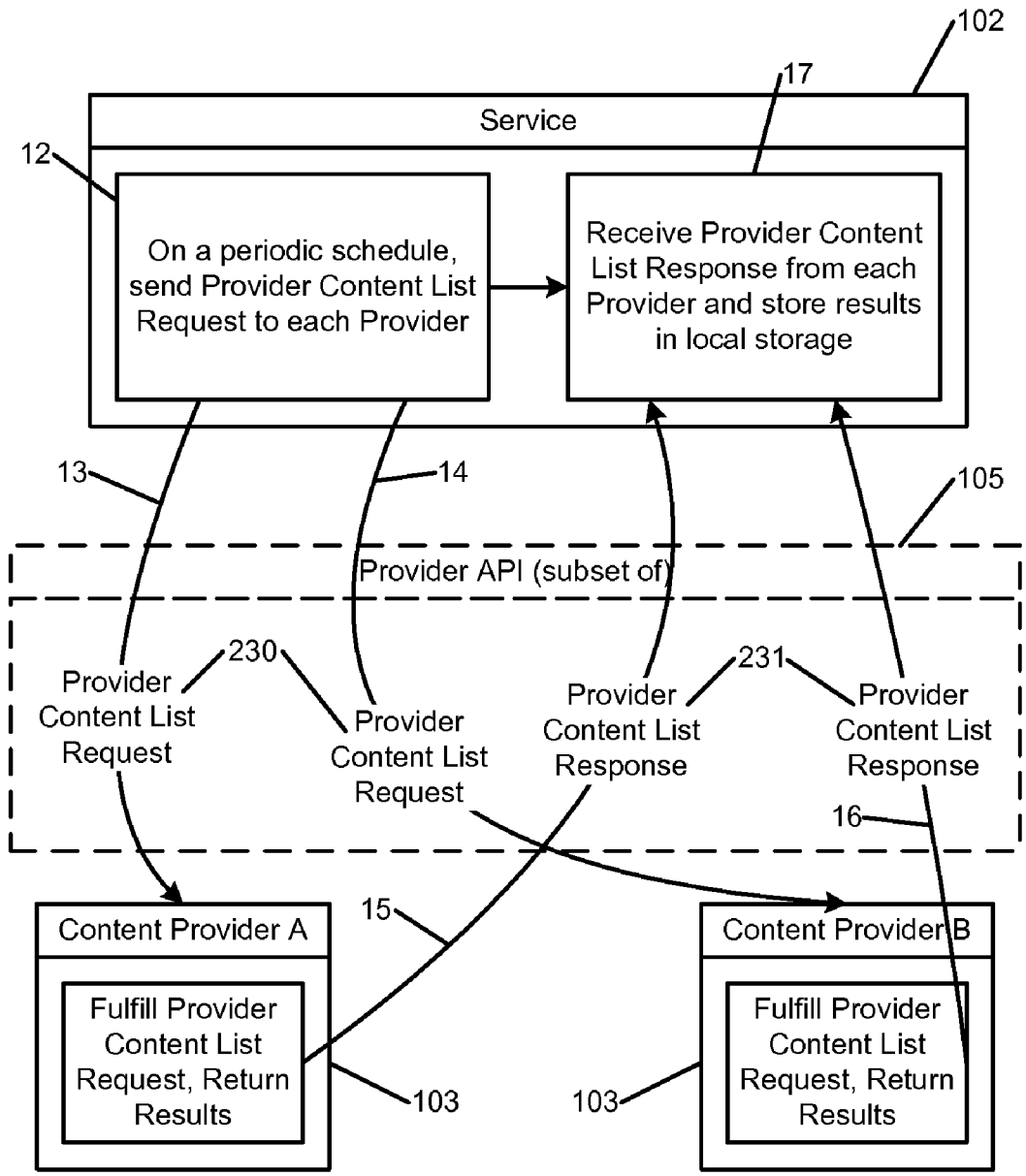
FIG. 14: Illustration of alternate Search Content communications between the service and content providers' systems.
Figure 15:
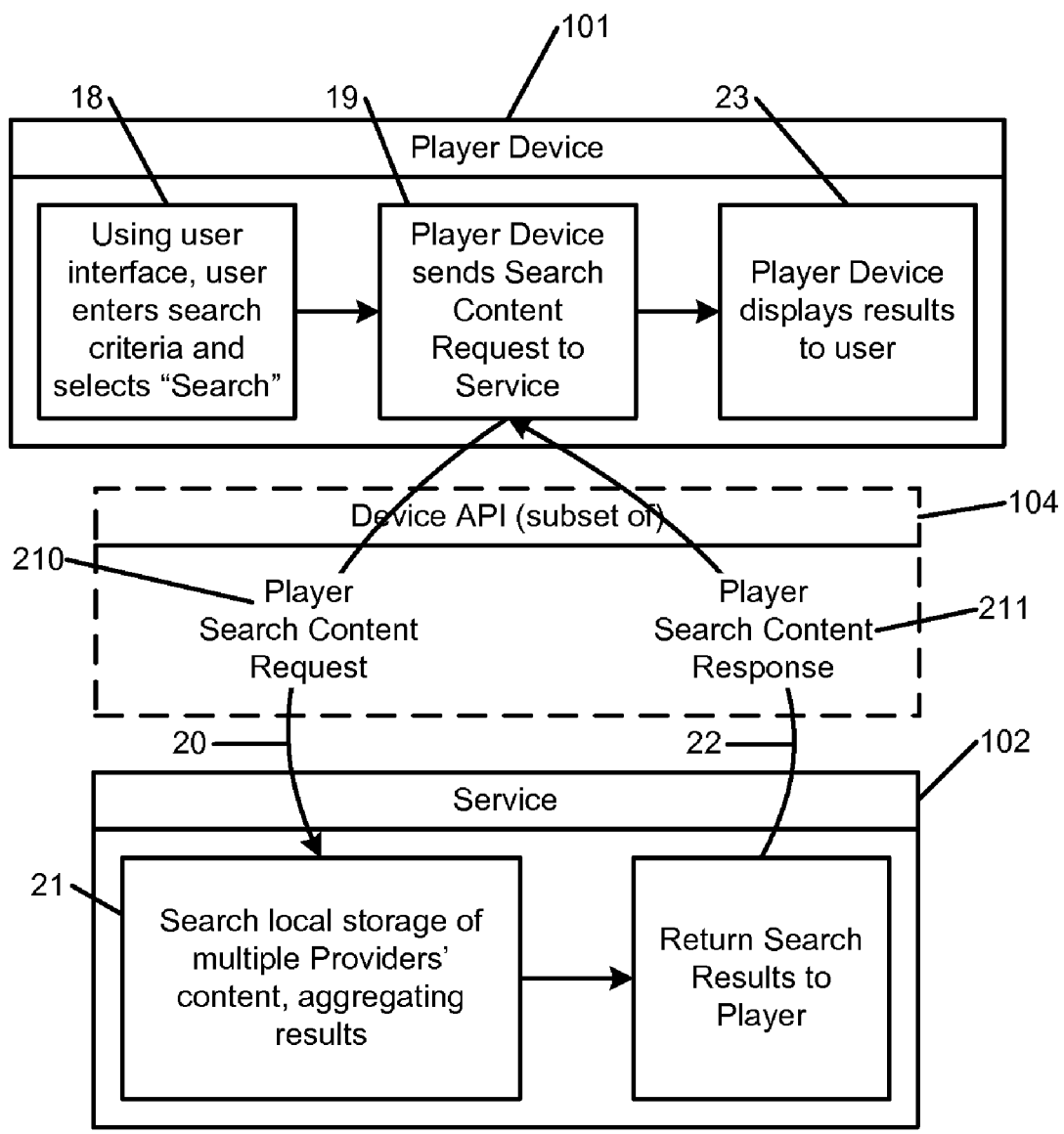
FIG. 15: Illustration of alternate Search Content communications between player devices and the service.
Figure 16:
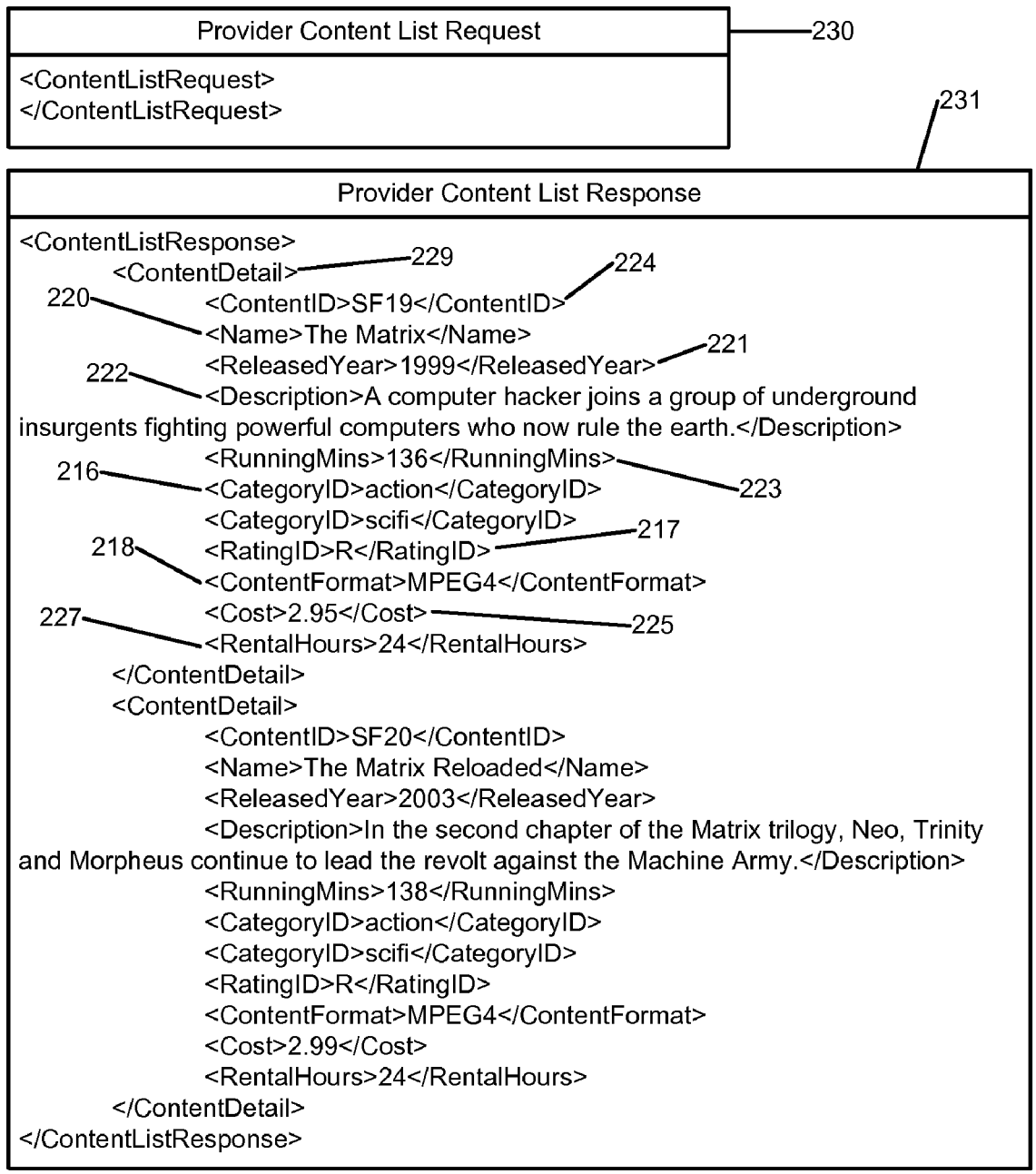
FIG. 16: Details possible data contained in Provider Content List Request and Provider Content List Response.

The above description is an example of real-time aggregation of multiple content providers' content. An alternative approach would be a design where the service 102 requests the complete content list from each content provider's system 103 on a periodic schedule and stores the results locally, perhaps in a database. Then, when a player device 101 makes a Player Search Content Request, the service 102 compiles the results from the locally stored content list. FIGS. 14 and 15 are examples of such a design. As shown in FIG. 14, on a periodic basis, the service 102 would loop through each content provider (step 12) and send a Provider Content List Request 230 to content provider's system 103 (steps 13 and 14). As each Provider Content List Response 231 is received from content provider's system 103 (steps 15 and 16), the service 102 would save the content list in local storage (step 17). As shown in FIG. 15, when the player device 101 is instructed by the user to search for content (step 18), the player device 101 sends a Player Search Content Request 210 to the service 102 (steps 19 and 20). The service 102 in turn searches local storage based on the search criteria, aggregates content from multiple content providers (step 21), and responds with a Player Search Content Response 211 (step 22). Finally, player device 101 displays the content list to the user (step 23). While the Player Search Content Request 210 and the Player Search Content Response 211 shown in FIG. 15 are the same data as illustrated in FIG. 11, the Provider Content List Request 230 and the Provider Content List Response 231 shown in FIG. 14 are variations of the Provider Search Content Request 212 and the Provider Search Content Response 213. FIG. 16 illustrates this data. Since all content from provider will be returned, the Provider Content List Request 230 contains no data elements. The Provider Content List Response 231 is very similar the Provider Search Content Response 213. Both contain the same Content Detail 229 data element, which is a container element that encapsulates the various data elements of a single piece of content. The difference is that Provider Content List Response 231 returns all available content while the Provider Search Content Response 213 only returns content matching the search and filter criteria.

Figure 18:
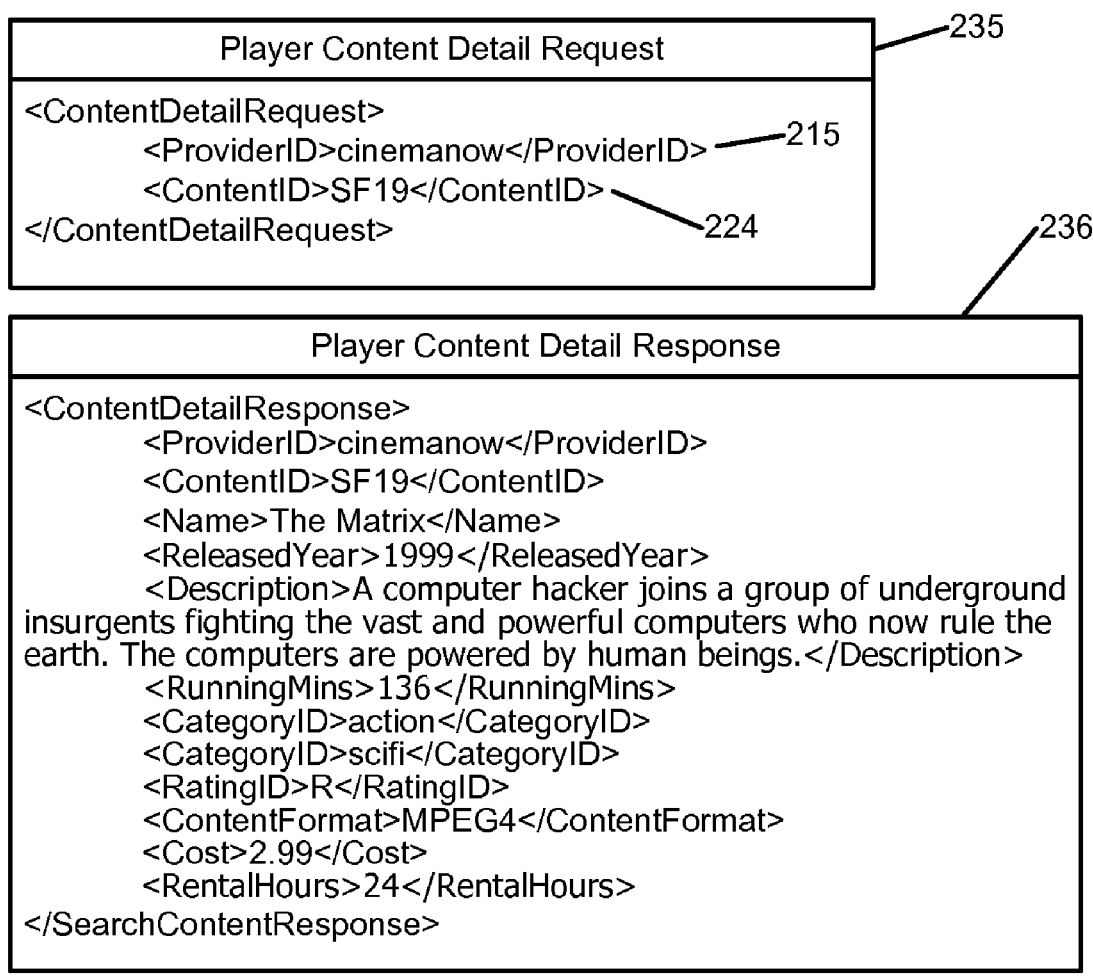
FIG. 18: Details possible data contained in Player Content Detail Request and Player Content Detail Response.

FIGS. 11, 12 and 13, as well as it variations in FIGS. 14, 15, 16, define a particular set of API calls, with the data contain within those calls, for searching for content based a particular criteria. An individual skilled in the art could easily reorganize these calls and data to achieve the same results. For example, it could be that only a few fields are returned in the results of the content search and another API call could be used to fetch the details of the content. FIG. 17 illustrates different data being returned in Player Search Content Response (Alt) 232. Instead of the Content Detail 219 data element being returned, a Content Summary 233 data element is returned. This data element only contains a few data fields, the ones necessary to display a simple list of content to the user, as shown in FIG. 5. FIG. 18 illustrates a new API request where the details a single piece of content is fetch individually. This new API request combines the fetching of the content details with additional data specific to the content provider (i.e. cost and rental period). The Player Content Detail Request 235 data element specifies the Provider ID 215 data element and the Content ID 224 data element. These two data elements would be populated from the corresponding data elements in the Content Provider 234 data element. The Player Content Detail Response 236 data element contains the combined fields from the Content Detail 219 data element and a single Content Provider 226 data element.

Figure 19:
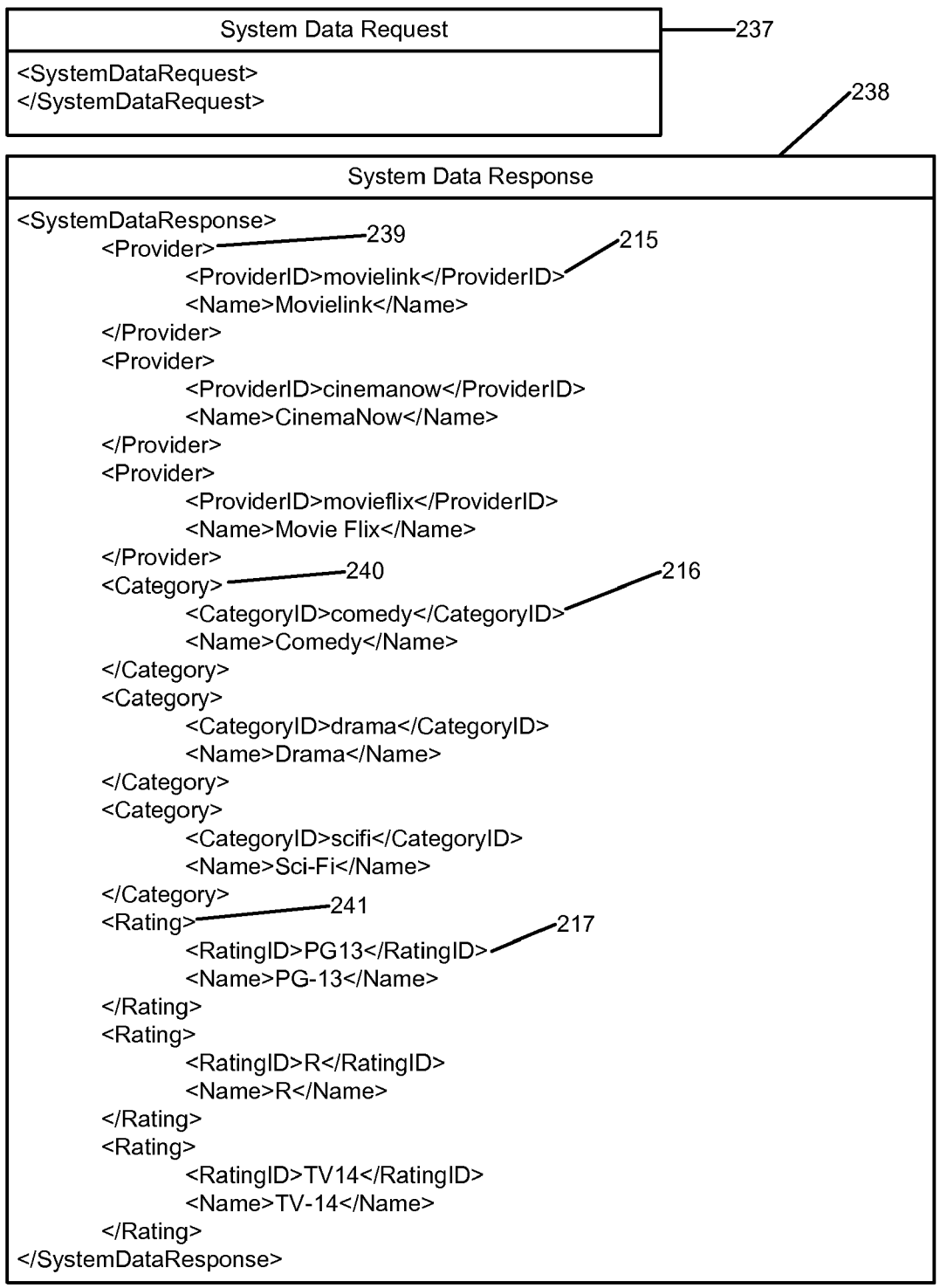
FIG. 19: Details possible data contained in System Data Request and System Data Response.

The Search Criteria 214 data element in the Player Search Content Request 210, as shown in FIG. 12, may contain some data elements that have a specific range of possible values. The Provider ID 215 data element, the Category ID 216 data element, and the Rating ID 217 data element are examples of this. The player device 101 needs to understand these ranges of values so that it can properly populate the Search Criteria 214 data element. To solve this problem, the System Data Request 237 and System Data Response 238, as illustrated in FIG. 19, allows the player device 101 retrieve these ranges of values from the service 102. System Data Request 237 requires no data elements. System Data Response 238 contains the complete list of content providers, contained in the repeating Provider 239 data element, the complete list of content categories, contained in the repeating Category 240 data element, and the complete list of content ratings, contained in the repeating Rating 241 data element. Please note that FIG. 19 only shows a subset of the possible values and that these lists may change over time. When the player device 101 needs to populate the Provider ID 215 data element in the Search Criteria 214 data element, it would use the Provider ID 215 data elements from one or more of the Provider 239 data elements. The same would be true such that the Category ID 216 and Rating ID 217 data elements in the Search Criteria 214 data element would be populated from the same data elements in the Category 240 and Rating 241 data elements, respectively.

Figure 20:
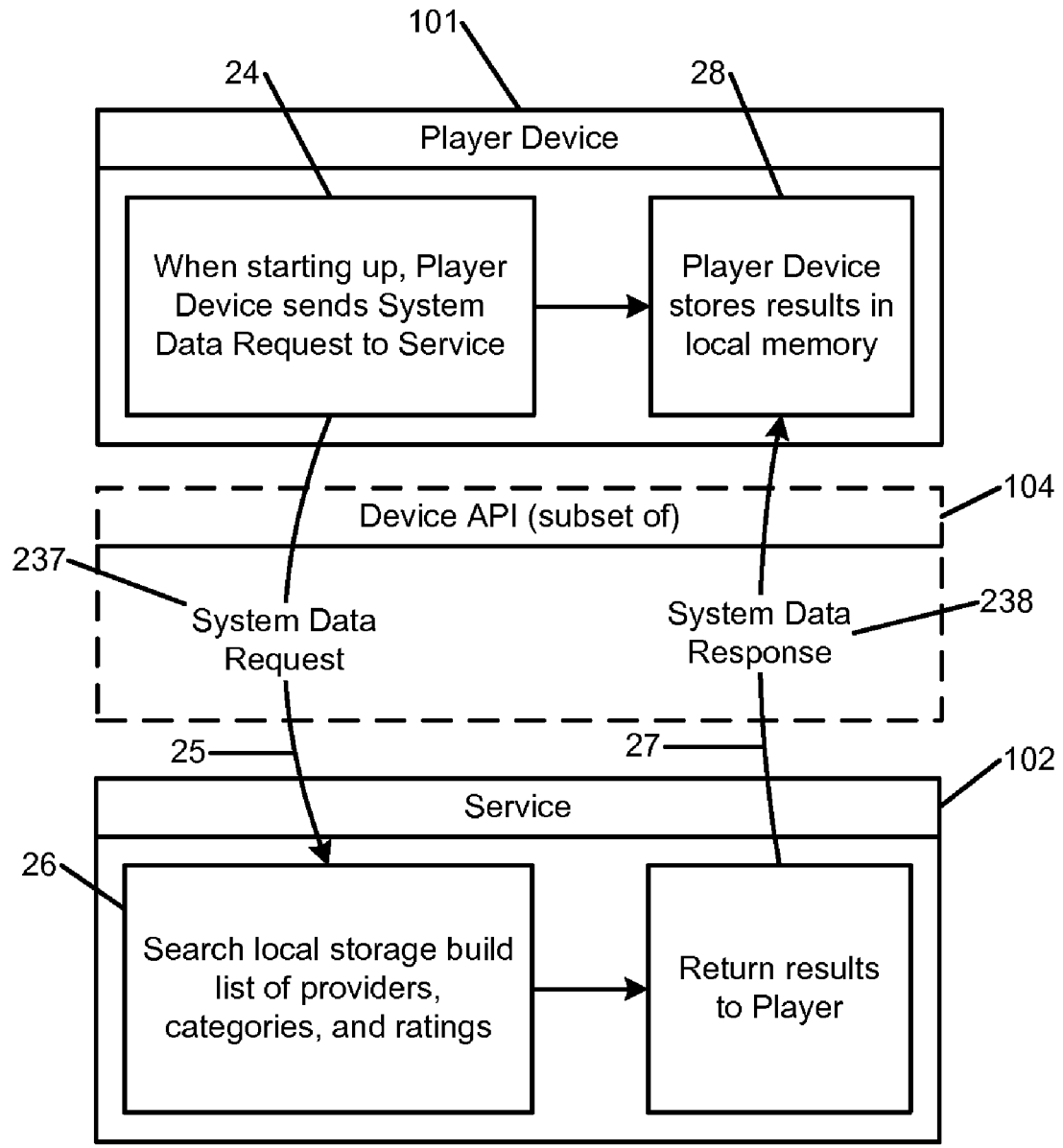
FIG. 20: Illustration of System Data communications between player devices and the service.

FIG. 20 illustrates the communications for the System Data Request 237 and System Data Response 238. When the player device 101 starts up, or on a periodic basis (step 24), it sends a System Data Request 237 to the service 102 (step 25). The service 102 in turn fetches all content providers, content categories, and content ratings from local storage (step 26), builds System Data Response 238 then returns it to player device 101 (step 27). Player device 101 would store results in local memory (step 28). System Data Request 237 and System Data Response 238 are a subset of the Device API 104.

If needed, the System Data Response 238 could be expanded to include additional data to be provided to the player device 101. Finally, the player device 101 would use the data in the System Data Response 238 to display these items in the user interface, as illustrated in FIGS. 5 and 7.

For content providers that allow for free, anonymous access to their content, no additional API calls would be necessary. For example, the Content Detail 219 data element from FIG. 12 could be expanded to include additional data fields as required for video/audio streaming or down loading 106.

Figure 21:
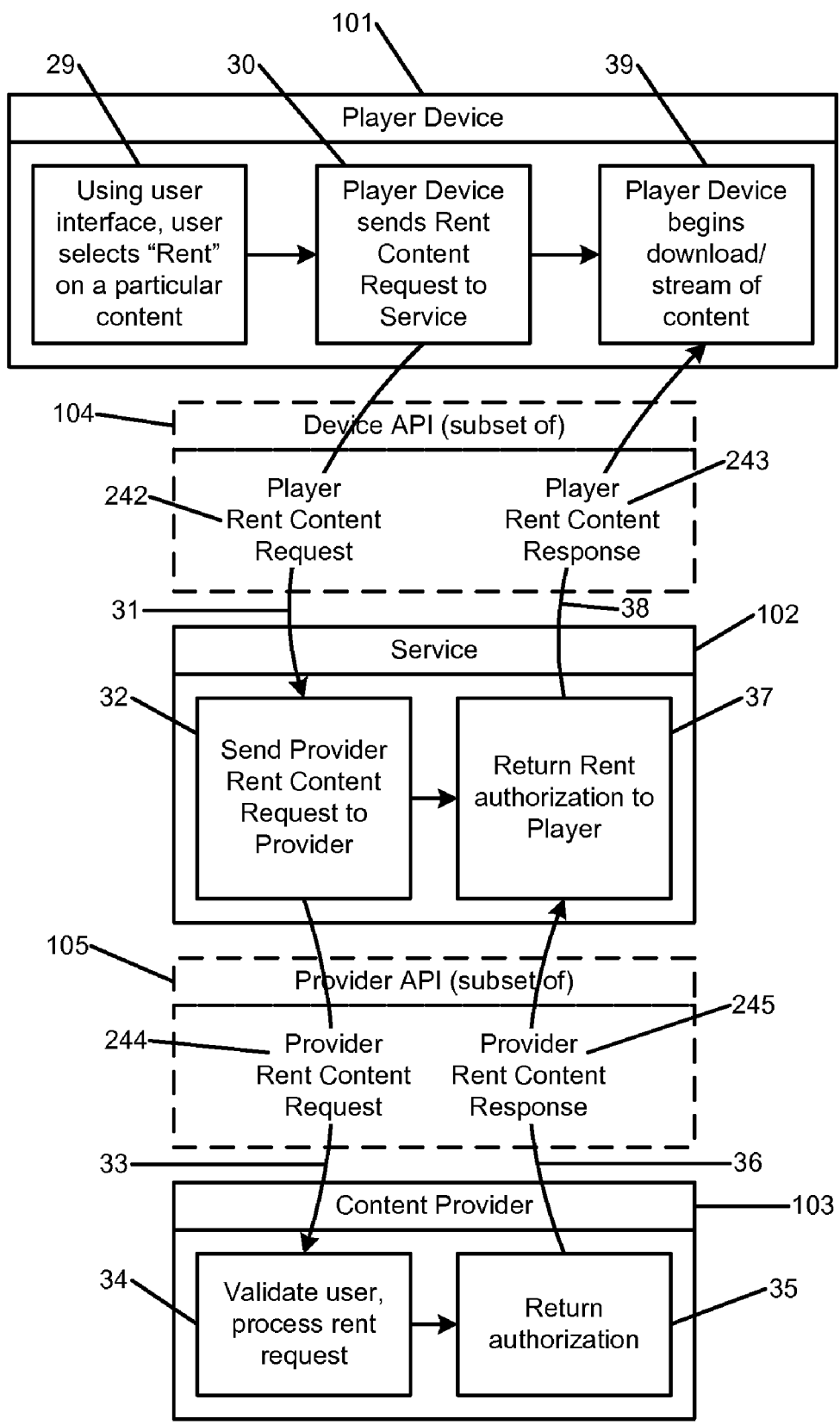
FIG. 21: Illustration of Rent Content communications between player devices, the service, and content providers' systems.

For content providers that require membership access to their content, additional API calls might be necessary. As shown in FIG. 21, when the player device 101 is instructed by the user to rent a particular content (step 29), the player device 101 sends a Player Rent Content Request 242 to the service 102 (steps 30 and 31). The service 102 in turn sends a Provider Rent Content Request 244 to specified content provider's system 103 (steps 32 and 33). Content provider's system 103 authorizes the user and processes the rent request (step 34) then returns an authorization with a Provider Rent Content Response 245 (steps 35 and 36). The service 102 then returns the Player Rent Content Response 243 (steps 37 and 38) to the player device 101. Finally, player device 101 begins downloading/streaming of content (step 39). Player Rent Content Request 242 and Player Rent Content Response 243 are a subset of the Device API 104. Provider Rent Content Request 244 and Provider Rent Content Response 245 are a subset of the Provider API 105.

Figure 22:
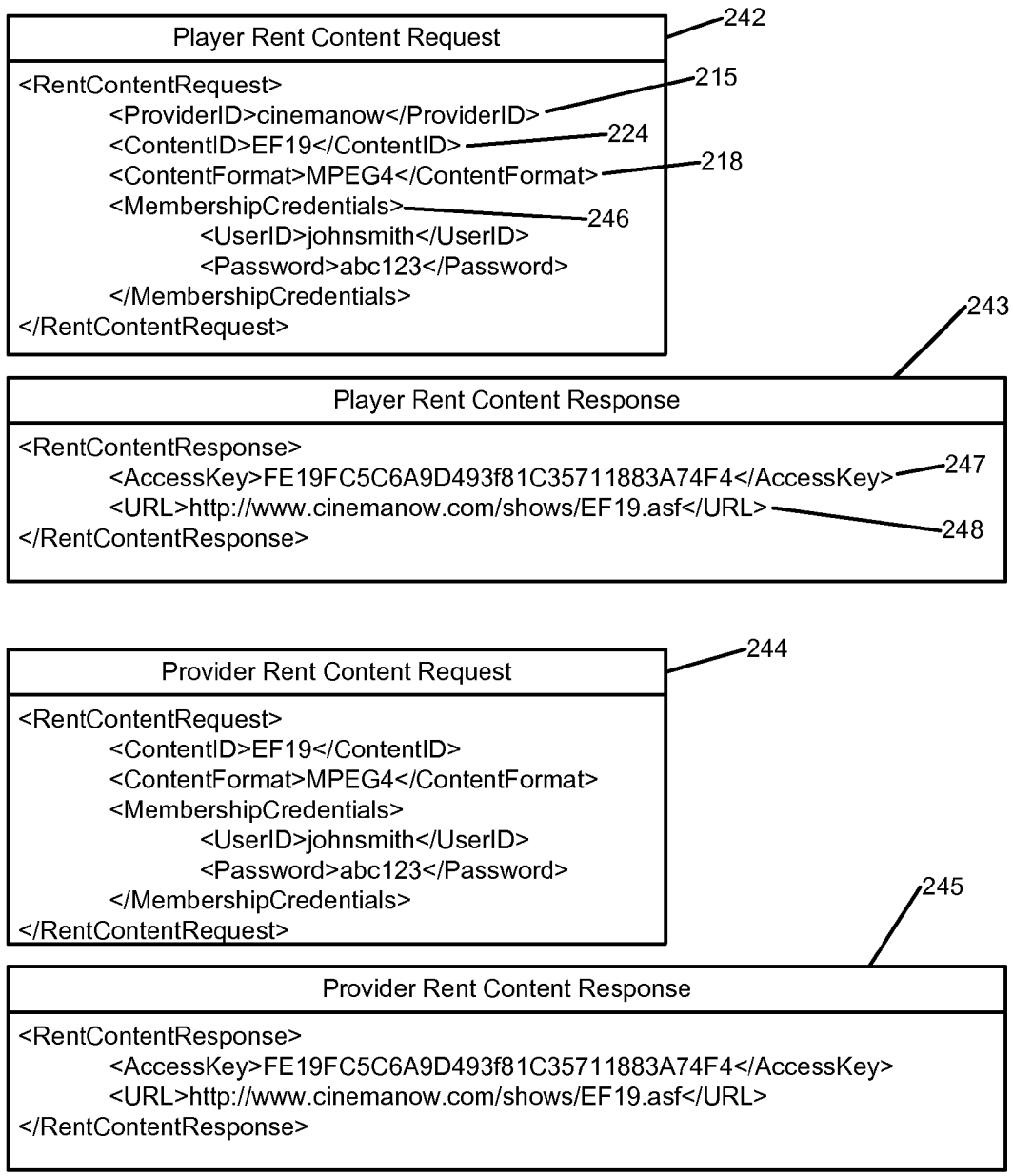
FIG. 22: Details possible data contained in Player Rent Content Request, Player Rent Content Response, Provider Rent Content Request, and Provider Rent Content Response.

FIG. 22 illustrates in detail the Player Rent Content Request 242, the Player Rent Content Response 243, the Provider Rent Content Request 244, and the Provider Rent Content Response 245, from FIG. 21, as discusses in the example above. As in FIG. 12, FIG. 22 shows the data in XML format, but any format could be used. In the Player Rent Content Request 242, the Provider ID 215, the Content ID 224, and the Content Format 218 data elements define a particular content and content format from a particular content provider. These three data elements would be populated from the corresponding data elements in the Content Provider 226 data element from the Player Search Content Response 211, as shown in FIG. 12. If multiple Content Format 218 data elements were returned in the Content Provider 226 data element, the player device 101 would select the most desired content format. The Membership Credentials 246 data element would be supplied by the user, as requested by the user interface 209 as shown FIG. 10. The Player Rent Content Response 243 illustrates the data that could be returned as a result of the request. The Access Key 247 data element could be an optional piece of data used for secure access to the content via a form of digital rights managements. The URL 248 data elements could define where the content exists on the network. Together these two data elements would be used for video/audio streaming or down loading 106. The Player Rent Content Response 243 could easily be expanded or changed to include data elements as may be required to provide access to secure or non-secure content. When the service 102 receives a Player Rent Content Request 242, it uses the Provider ID 215 data element to determine which content provider to communicate with. The remaining data elements of Player Rent Content Request 242 are copied straight to the Provider Rent Content Request 244 data element. The Provider Rent Content Response 245 data element received from the content provider's system 103 is copied straight to the Player Rent Content Response 243.

The above example illustrates a method of renting where the user has a membership at the content provider. There are additional methods of renting that could be implemented. For example, perhaps content providers allow non-membership renting which includes payment via a credit card or some other payment mechanism. In this case, the Membership Credentials 246 data element could be replace with a data element that contain payment information, such as Credit Card Number, Credit Card Expiration date, Name on Credit Card, etc.

For users who do not have a membership with a particular content provider, device API 104 and provider API 105 could be enhanced to support new membership sign-ups. The player device 101 could prompt the user for required data. Once the data is collected, the player device 101 could submit a device API 104 enrollment request to the service 102, which in turn would submit a player API 105 enrollment request to content provider's system 103.

The figures and descriptions above containing the Content ID 224 data element, illustrate a method where the content provider defines the Content ID 224 data element. In another embodiment where content is cache to local storage within the service 102, as illustrated in FIGS. 14 and 15, a unique Content ID could be assigned to each content, independent of which content providers provided the content. In FIG. 12, the Player Search Content Response 211 could be changed such that the Content ID 224 data element could be removed from the Content Provider 226 data element and added to the Content Detail 219 data element. Then, the Content ID 224 data element in the Player Rent Content Request 242, from FIG. 22, would be the Content ID as assigned by the service 102. Finally, when the service 102 is fulfilling a Player Rent Content Request 242, it would need to translate the Content ID 224 data element into the provider specific Content ID 224 in the Provider Rent Content Request 244.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method of exposing a single aggregated data structure containing a list of available video and audio content from a plurality of content providers and for tracking requested content from multiple content providers in a separate list of requested content, comprising:
   receiving a first request for available video and audio content from a player device;
   receiving a pre-determined data structure containing a list of available video and audio content from each of said plurality of content providers;
   storing each said list of available video and audio content into a computer-based repository of available video and audio content; and
   returning said single aggregated data structure containing a list of available video and audio content to said player device in response to said first request;

receiving a second request to access said content from a player device;

storing requested said content in said separate list of requested content;

ascertaining a predetermined content identifier within said second request; and storing said predetermined content identifier with said separate list of requested content.

2. The method of claim 1, said receiving said second request further comprising:

ascertaining a predetermined player device identifier within said request;

storing said predetermined player device identifier with said separate list of requested content.

3. The method of claim 1, said receiving said second request further comprising:

ascertaining a predetermined user identifier within said request;

storing said predetermined user identifier with said separate list of requested content.

4. The method of claim 1, said receiving said request further comprising:

ascertaining a predetermined content provider identifier within said request;

storing said predetermined content provider identifier with said separate list of requested content.

5. The method of claim 1, further comprising exposing said separate list of requested content.

6. The method of claim 5, further comprising:

receiving a third request for said separate list of requested content from a player device;

returning said separate list of requested content to said player device in response to said request.

7. The method of claim 6, said receiving said third request further comprising:

ascertaining a predetermined filter criteria within said third request.

8. The method of claim 7, said receiving said third request further comprising:

matching said predetermined filter criteria against said separate list of requested content.

* * * * *